(12) United States Patent
Manley

(10) Patent No.: US 7,555,620 B1
(45) Date of Patent: Jun. 30, 2009

(54) METHOD AND SYSTEM OF USING A BACKUP IMAGE FOR MULTIPLE PURPOSES

(75) Inventor: Stephen Lee Manley, Pleasanton, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 228 days.

(21) Appl. No.: 11/413,988

(22) Filed: Apr. 28, 2006

(51) Int. Cl.
*G06F 12/00* (2006.01)

(52) U.S. Cl. ............................ 711/162; 707/204

(58) Field of Classification Search ............ None
See application file for complete search history.

(56) References Cited

U.S. PATENT DOCUMENTS

| | | | |
|---|---|---|---|
| 5,680,611 A | 10/1997 | Rail et al. |
| 5,761,678 A | 6/1998 | Bendert et al. |
| 6,453,354 B1 | 9/2002 | Jiang et al. |
| 6,658,423 B1 | 12/2003 | Pugh et al. |
| 6,789,156 B1 | 9/2004 | Waldspurger |
| 6,928,526 B1 | 8/2005 | Zhu et al. |
| 7,065,619 B1 | 6/2006 | Zhu et al. |
| 2002/0169934 A1 | 11/2002 | Krapp et al. |
| 2003/0018878 A1 | 1/2003 | Dorward et al. |
| 2003/0182317 A1 | 9/2003 | Kahn et al. |
| 2005/0152192 A1 | 7/2005 | Boldy et al. |

OTHER PUBLICATIONS

"EMC Centera Content Addressed Storage System, Innovations for the Content Wave", 2003, pp. 1-4, EMC Corporation, Hopkinton, Massachusetts.

Jarad Carleton, "Solutions for the Automotive Industry in Meeting the Legislated Demands of Record Retention and Accessibility", 2003, pp. 1-9, Frost & Sullivan, San Jose, CA.

*Primary Examiner*—Kevin Verbrugge
(74) *Attorney, Agent, or Firm*—Blakely, Sokoloff, Taylor & Zafman LLP

(57) ABSTRACT

A method for utilizing a backup image of a dataset for multiple purposes, including modifying or deleting any data thereof, yet without changing or modifying the original backup image such that it may be used for backup/restore purposes later. Upon a request to access any part of the backup image, a clone of containing that part is created by using block sharing technology such that the clone and the original part share the same data blocks. In addition, upon a request to view an expanded structure of the backup image, a set of metadata describing the structure of the backup image and providing a basis for accessing and locating data stored therein is accessed to create the expanded view.

33 Claims, 9 Drawing Sheets

METHOD AND SYSTEM OF USING A BACKUP IMAGE FOR MULTIPLE PURPOSES

FIELD OF THE INVENTION

At least one embodiment of the present invention pertains to file system or application management, and more particularly, to using a backup image of application data, a file system or a part of the file system for multiple purposes.

BACKGROUND

In a prior art network based storage backup system shown in FIG. 1, a system administrator usually schedules a backup of a source file system 101 or a part of the source file system on a file server 100 via a Network Backup Master (NBM) 104. A file system is an independently managed, self-contained, hierarchal set of data units (e.g., files, bocks or Logical Unit Numbers (LUNs)). Although a volume or file system (as those terms are used herein) may store data in the form of files, that is not necessarily the case. That is, a volume or file system may store data in the form of other units, such as blocks or LUNs. The NBM 104 then coordinates the backup process between the file server 100 and a Media Server (MS) 105, which receives a backup image of the source file system 101 or a part of the source file system and stores the backup image into various target backup devices, such as a tape device 106, a disk storage unit 107, and/or a Virtual Tape Library (VTL) 108, etc. The NBM 104 communicates with the file server 100 via a Network Backup Unit (NBU) 102 of the file server. The file server 100 is coupled with a storage subsystem 103, which contains the actual data of the file system 101.

In some cases, a backup image of the file system 101 or a dataset within the file system (a list of directories and files in the file system, for example) may be in a compacted or archival format (a sequential format such as a .tar file, for example), instead of in the file system or the dataset's original format (directory structured format, for example). In other words, rather than being a literal (or physical) duplicate of the source (a persistent point-in-time image of the source, for example), a compacted backup image of the source is a logical copy with a different structure or format. For illustration purposes, the term "backup image" refers to compacted or archival backup image in the present application. FIG. 2 illustrates an example of creating a backup image 202 of a directory structured file system 201. In order to create a backup image of a file system or a part of the file system, a format must be followed so that the file system or the part of the file system may be recovered from the backup image. Each software vendor may use its own format. For example, the backup image 202 may capture the metadata of the file system 201 (i.e., pathname, security, attributes of the system's files) in the vendor's proprietary format. As a result, the vendor's software is needed to utilize the backup image 202 or a part of the backup image (one or more files contained in the backup image, for example). FIG. 3 is a block diagram illustrating a prior art mechanism of utilizing a backup image for multiple purposes. As shown, a vendor specific software or control logic 301 receives a backup image 302 and analyzes it according to its format to create an expanded view of the backup image 303 or to create an expanded version of the whole backup image or any part of the backup image 304. An expanded view of a backup image of a dataset may be, for example, the directory structure of the dataset including the list of files under each directory. An expanded version of the whole backup image may be, for example, an extracted copy of the backup image. An expanded version of a part of the backup image may be, for example, an extracted copy of one or more files within the backup image. The backup image should be kept unchanged so that it may be used to restore the file system back to the state when the backup image was created, if necessary (e.g., in the event of a major failure causing loss of data). Thus, multiple copies of an expanded version of the whole backup image or any part of the backup image 304 need to be created so that each copy may be used for a different purpose that may involve modification or deletion of any data thereof. However, this mechanism is very inefficient in storage usage, because in most cases there are a lot of data redundancies among these copies created even if each copy may undergo some change. This inefficiency tends to get worse as the size of each copy gets larger. In addition, the creation of each of these copies takes time. When there are many simultaneous requests targeting one backup image, the waiting time in creating these copies becomes longer.

SUMMARY OF THE INVENTION

The present invention includes a method and system for using a backup image of a dataset for multiple purposes. In at least one embodiment, the method includes maintaining a backup image of a dataset as a plurality of data blocks. The method further includes creating a clone of a part of the backup image of the dataset, in response to a request to access the part of the backup image, such that the clone shares at least some of the plurality of data blocks with the backup image of the dataset, yet any change made to the clone does not affect these shared data blocks.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system of using a backup image for multiple purposes are described. References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

The present invention provides a technique to utilize a backup image of a dataset for multiple purposes, yet without changing or modifying the original backup image, such that the original backup image may be used for restoration purposes. According to the technique being introduced here, whenever there is a request involving utilizing the whole backup image, a clone of the backup image is created for such purposes; and whenever there is a request involving utilizing a part of the backup image, a clone of the part of the backup image is created for such purposes A part of the backup image may be, for example, one or more files contained in the backup image. The present invention uses data block sharing technology to create a clone of the backup image or any part of it, such that the clone shares the data blocks with the source data.

Figure 4A:
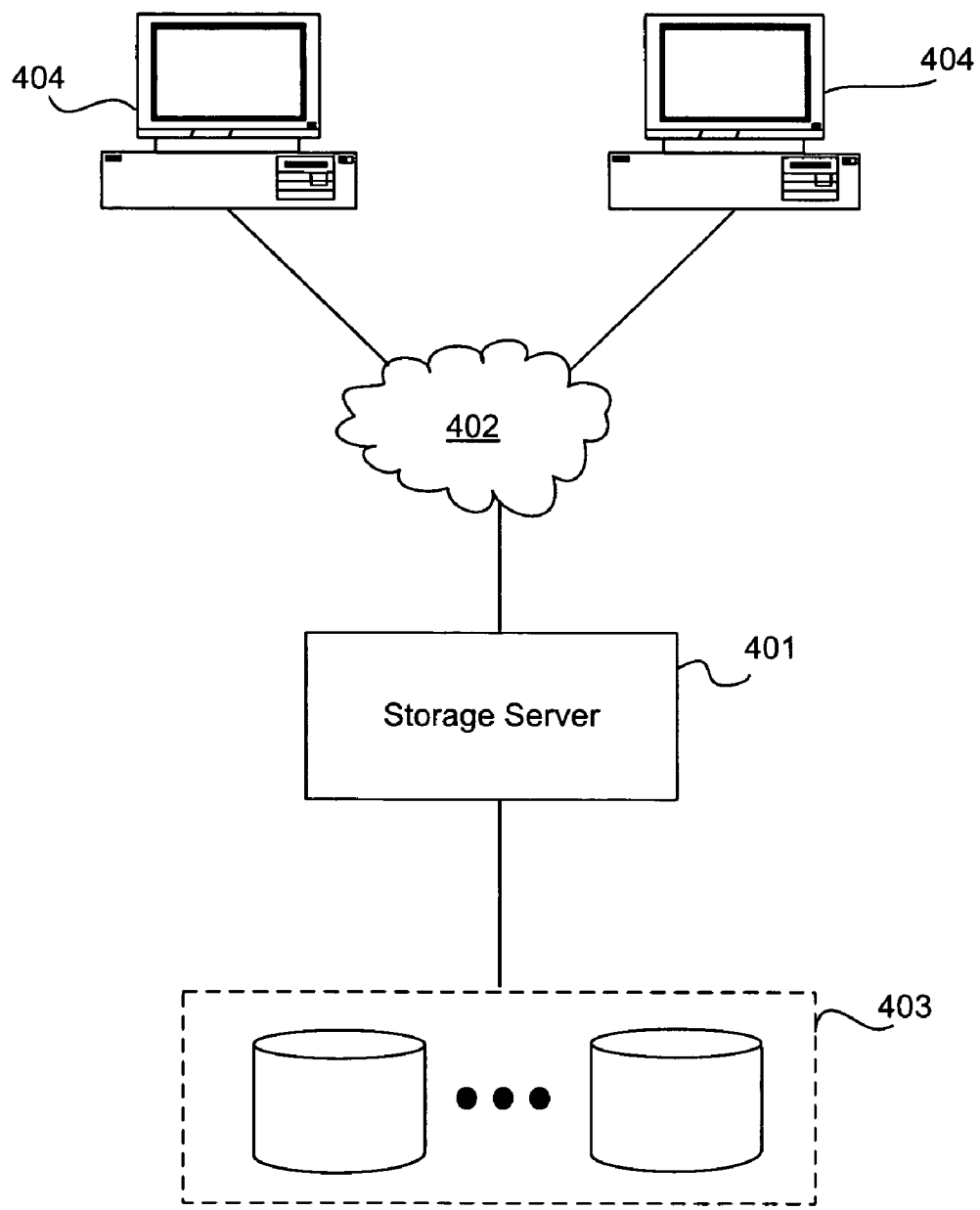
FIG. 4A illustrates a network environment in which the present invention may be implemented.

FIG. 4A illustrates a network environment in which the present invention may be implemented. A storage server 401 is coupled to a storage subsystem 403, which includes multiple mass storage devices (e.g., disks). The storage server 401 is also coupled through a network 402 to a number of storage clients 404 (hereinafter simply "clients"). The storage subsystem 403 is managed by the storage server 401. The storage server 401 receives and responds to various read and write requests from the clients 404, relating to volumes, LUNs, files, and/or other units of data stored in (or to be stored in) the storage subsystem 403.

The storage server 401 may maintain at least one write-out-of-place file system. In a "write-out-of-place" file system, whenever a data block is modified, it is written to a new physical location on disk. This is in contrast with a "write-in-place" approach, where a data block, when modified, is written in its modified form back to the same physical location on disk. An example of file system software that implements write-out-of-place is the WAFL® file system software included in the Data ONTAP® storage operating system designed and developed by Network Appliance, Inc. (NetApp®) of Sunnyvale, Calif.

Each of the clients 404 may be, for example, a conventional personal computer (PC), workstation, or the like. The storage server 401 may be, for example, a file server used in a NAS mode (a "filer"), a block-based storage server such as used in a storage area network (SAN), a storage server which can perform both file-level access and block-level access for clients, or another type of storage server. The network 402 may be, for example, a local area network (LAN), a metropolitan area network (MAN), a wide area network (WAN), a global area network (GAN) such as the Internet, or other type of network or combination of networks. The network 402 may implement, for example, Ethernet protocol, Fibre Channel protocol, or another protocol or a combination of protocols.

The storage subsystem 403 may store data represented in a file system of the storage server 401. The mass storage devices in the storage subsystem 403 may be, for example, conventional magnetic disks, optical disks such as CD-ROM or DVD based storage, magneto-optical (MO) storage, or any other type of non-volatile storage devices suitable for storing large quantities of data. The storage devices in the storage subsystem 403 can be organized as one or more RAID groups, in which case the storage server 401 accesses the storage subsystem 403 using an appropriate RAID protocol.

Figure 4B:
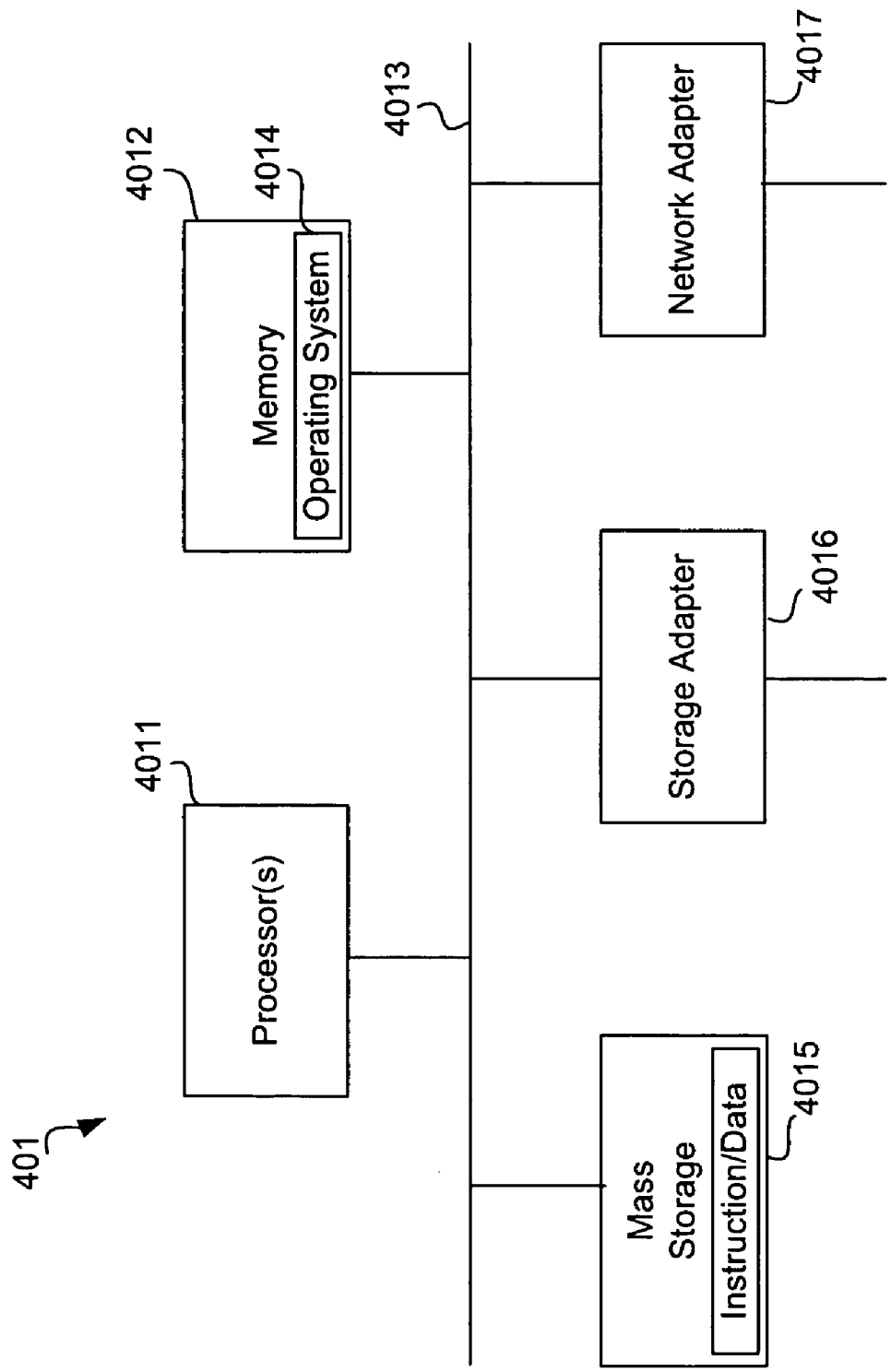
FIG. 4B is a high-level block diagram of a storage server.

FIG. 4B is a high-level block diagram of the storage server, on which the present invention may be implemented. Certain standard and well-known components which are not germane to the present invention are not shown. The storage server 401 includes one or more processors 4011 coupled to a bus system 4013.

The bus system 4013 in FIG. 4B is an abstraction that represents any one or more separate physical buses and/or point-to-point connections, connected by appropriate bridges, adapters and/or controllers. The bus system 4013, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 4011 are the central processing units (CPUs) of the storage server 401 and, thus, control the overall operation of the storage server 401. In certain embodiments, the processors 4011 accomplish this by executing software stored in memory 4012. A processor 4011 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 401 also includes memory 4012 coupled to the bus system 4013. The memory 4012 represents any form of random access memory (RAM), read-only memory (ROM), flash memory, or a combination thereof. Memory 4012 stores, among other things, the operating system 4014 of the storage server 401, in which the processes introduced here can be implemented.

Also connected to the processors 4011 through the bus system 4013 are a mass storage device 4015, a storage adapter 4016, and a network adapter 4017. Mass storage device 4015 may be or include any conventional medium for storing large quantities of data in a non-volatile manner, such as one or more disks. The storage adapter 4016 allows the storage server 401 to access the storage subsystem 403 which maintains the file system(s) and may be, for example, a Fibre Channel adapter or a SCSI adapter. The network adapter 4017 provides the storage server 401 with the ability to communicate with remote devices such as the clients 404 over a network and may be, for example, an Ethernet adapter or a Fibre Channel adapter.

Memory 4012 and mass storage device 4015 store software instructions and/or data, which may include instructions and/or data used to implement the techniques introduced here. These instructions and/or data may be implemented as part of the operating system 4014 of the storage server 401.

Figure 4C:
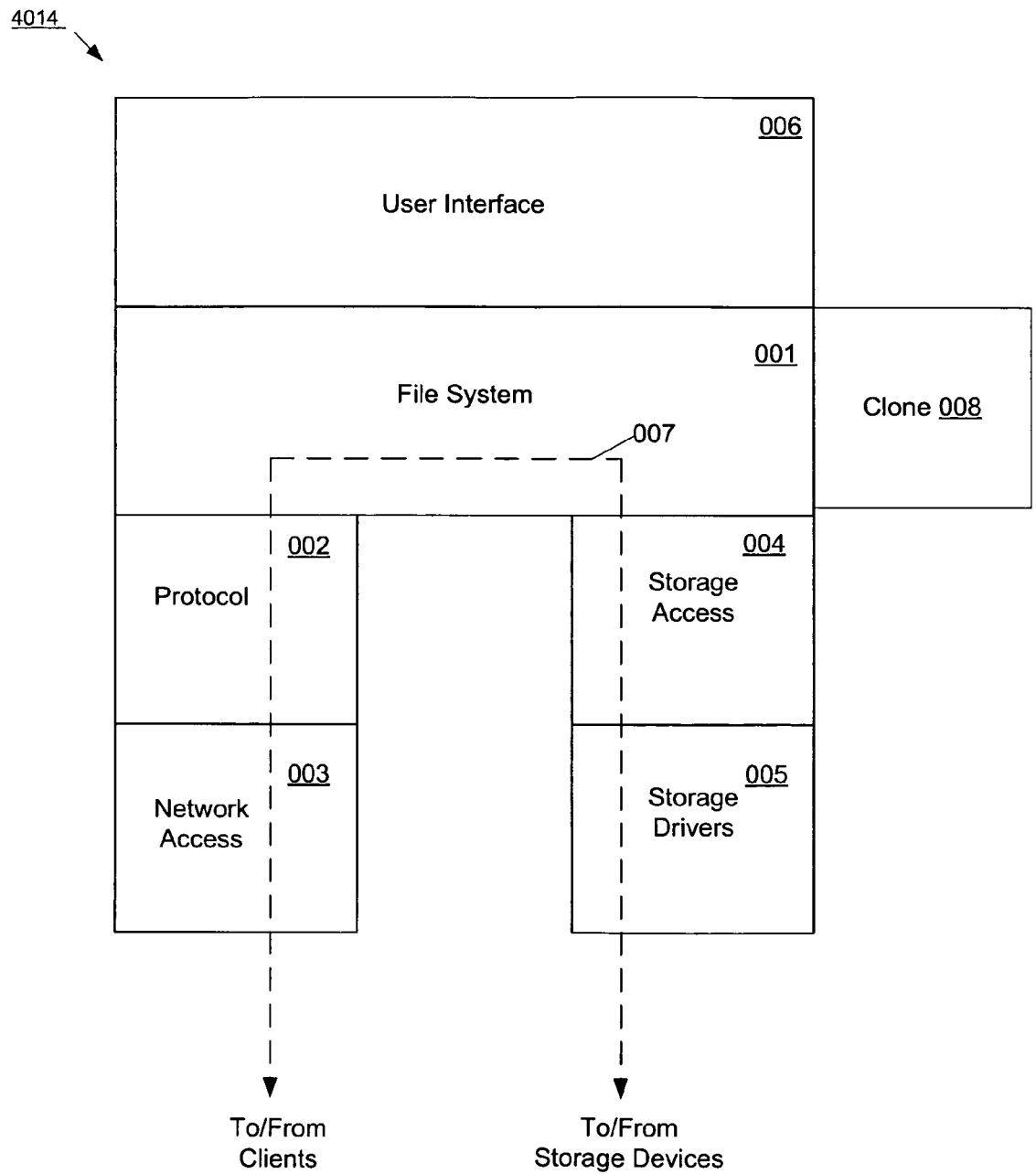
FIG. 4C illustrates the operating system of a storage server.

As shown in FIG. 4C, the operating system 4014 of the storage server 401 can include several modules, or layers. These layers include a file system layer 001. The file system layer 001 is an application-level programmatic entity which imposes a structure (e.g. hierarchical) on volumes, files, directories and/or other data containers stored and/or managed by a storage server 401, and which services read/write requests from clients of the storage server. An example of a file system layer which has this functionality is the WAFL® file system software that is part of the Data ONTAP® storage operating system from NetApp.

Logically under the file system manager 001, the operating system 4014 also includes a network layer 002 and an associated network media access layer 003, to allow the storage server 401 to communicate over a network (e.g., with clients 404). The network layer 002 implements various protocols, such as NFS, CIFS, HTTP, SNMP, and TCP/IP. The network media access layer 003 includes one or more drivers which implement one or more protocols to communicate over the interconnect, such as Ethernet or Fibre Channel. Also logically under the file system manager 001, the operating system 4014 includes a storage access layer 004 and an associated storage driver layer 005, to allow the storage server 401 to communicate with the storage subsystem 403. The storage access layer 004 implements a storage redundancy protocol, such as RAID-4 or RAID-5, while the storage driver layer 005 implements a lower-level storage device access protocol, such as Fibre Channel or SCSI. Reference numeral 007 in FIG. 4C shows the data access path through the operating system 4014, associated with servicing read and write requests from clients.

The operating system 4014 may include a clone layer 008, which interfaces with the file system layer 001 and external clone client software, to allow creation of a clone of a dataset of the file system, i.e., a file, a database, etc. The operating system 4014 may also include a user interface layer 006, which implements a graphical user interface (GUI) and/or a command line interface (CLI), which may be transmitted to a client 404, for example, such as for purposes of access to the storage server 401.

Figure 1:
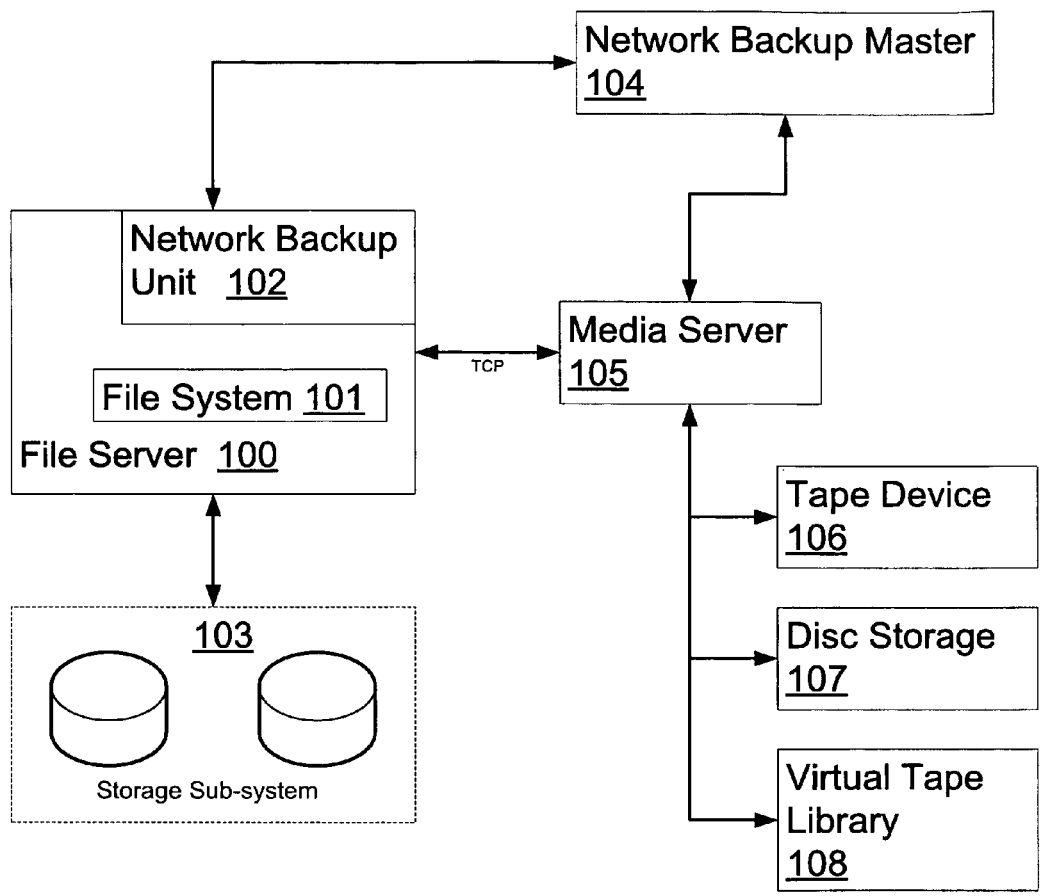
FIG. 1 illustrates a prior art storage backup system.
Figure 2:
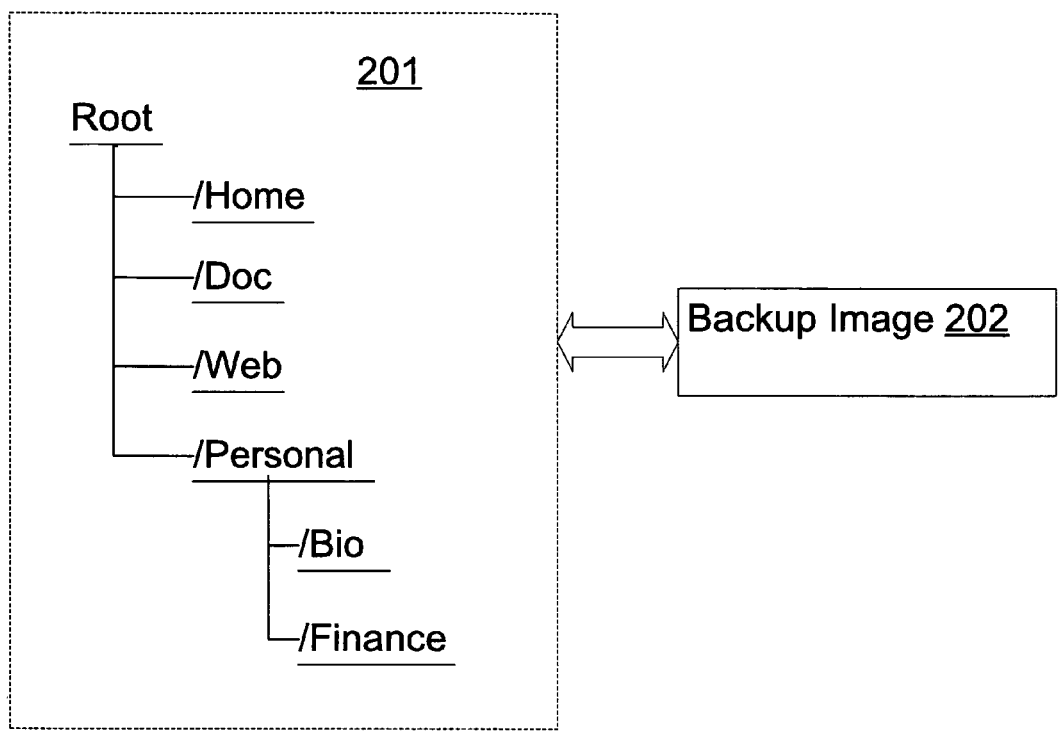
FIG. 2 illustrates an example of creating a backup image of a directory structured file system.
Figure 3:
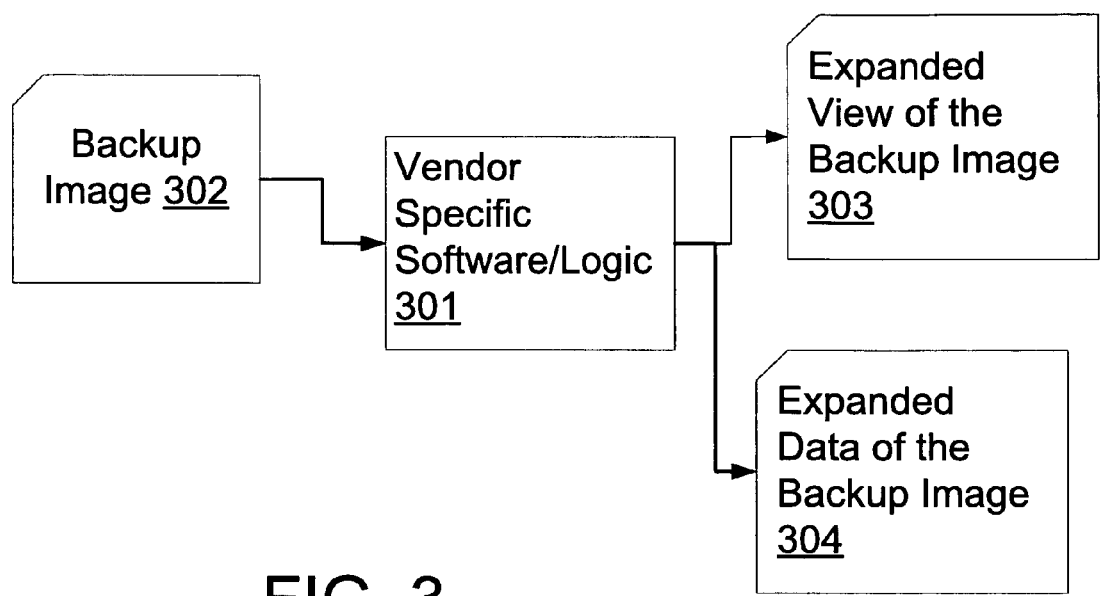
FIG. 3 is a block diagram illustrating a prior art mechanism of utilizing a backup image for multiple purposes.
Figure 5:
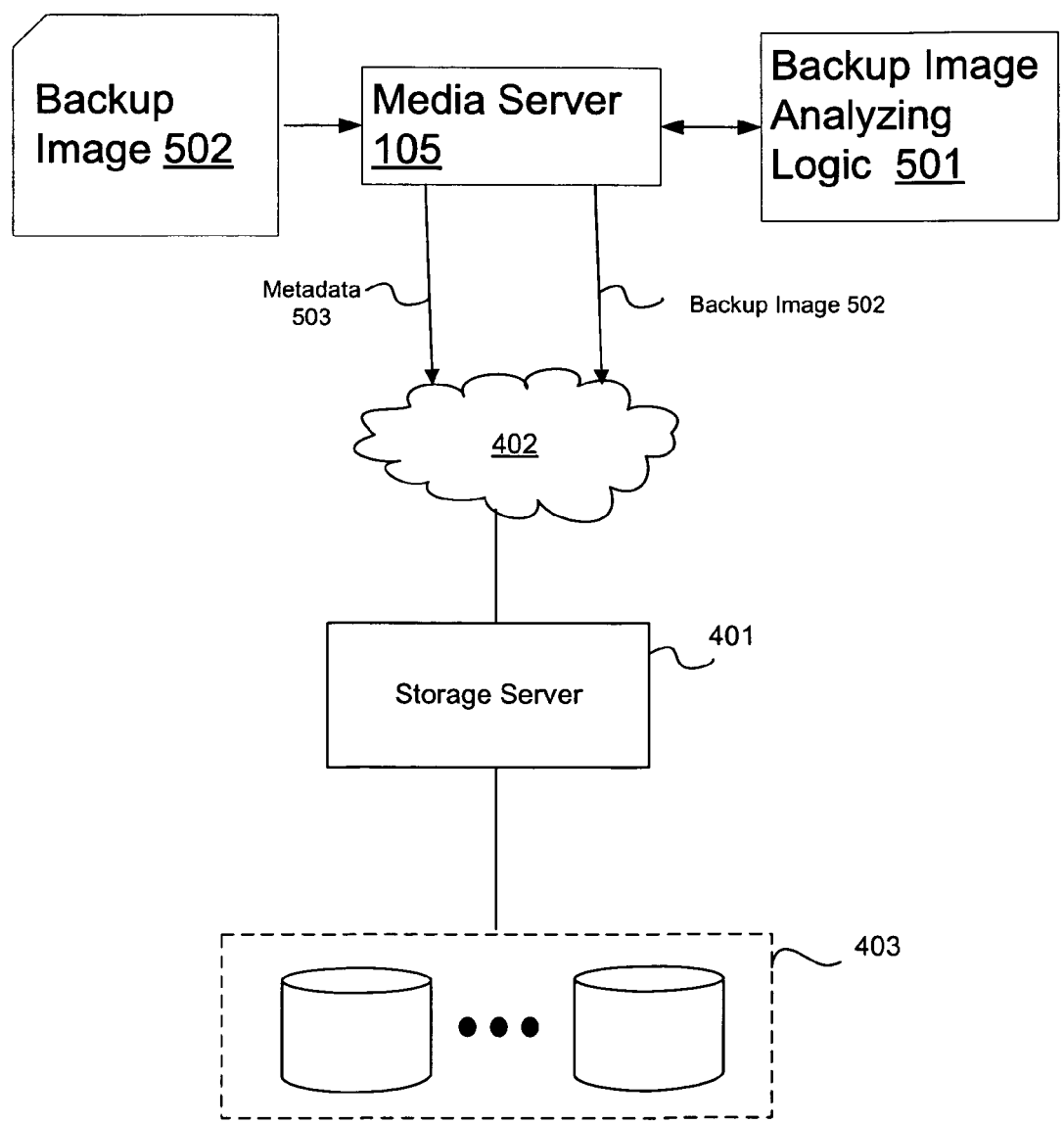
FIG. 5 is a block diagram illustrating a mechanism of storing a backup image of a source dataset into a storage server for multiple purposes according to an embodiment of the present invention.

FIG. 5 is a block diagram illustrating a mechanism of storing a backup image of a source dataset into a storage server for multiple purposes according to an embodiment of the present invention. As shown, the Media Server (MS) 105 receives a backup image 502 (from the source file system 101 shown in FIG. 1, for example). The MS 105 is connected with a Backup Image Analyzing Logic (BIAL) 501, which understands the format of the backup image 502 based on vendor published document(s) or by reverse engineering, for example. The backup image 502 includes a set of metadata in a vendor specific format. The BIAL 501 analyzes the vendor specific metadata of the backup image 502 to create a new set of metadata 503. The new set of metadata 503 describes the structure of the backup image 502 and provides a basis for accessing and locating data stored therein. Further, the new set of metadata 503 is created in open accessible data format, accessible by various types of applications. Note that alternatively the BIAL 501 may be part of the MS 105. After the BIAL 501 creates the set of metadata 503, the MS 105 sends the set of metadata 503 and the backup image 502 to a storage server 401 via the network 402. The storage server 401 then stores the set of metadata 503 and the backup image 502 into its storage subsystem 403.

Figure 6:
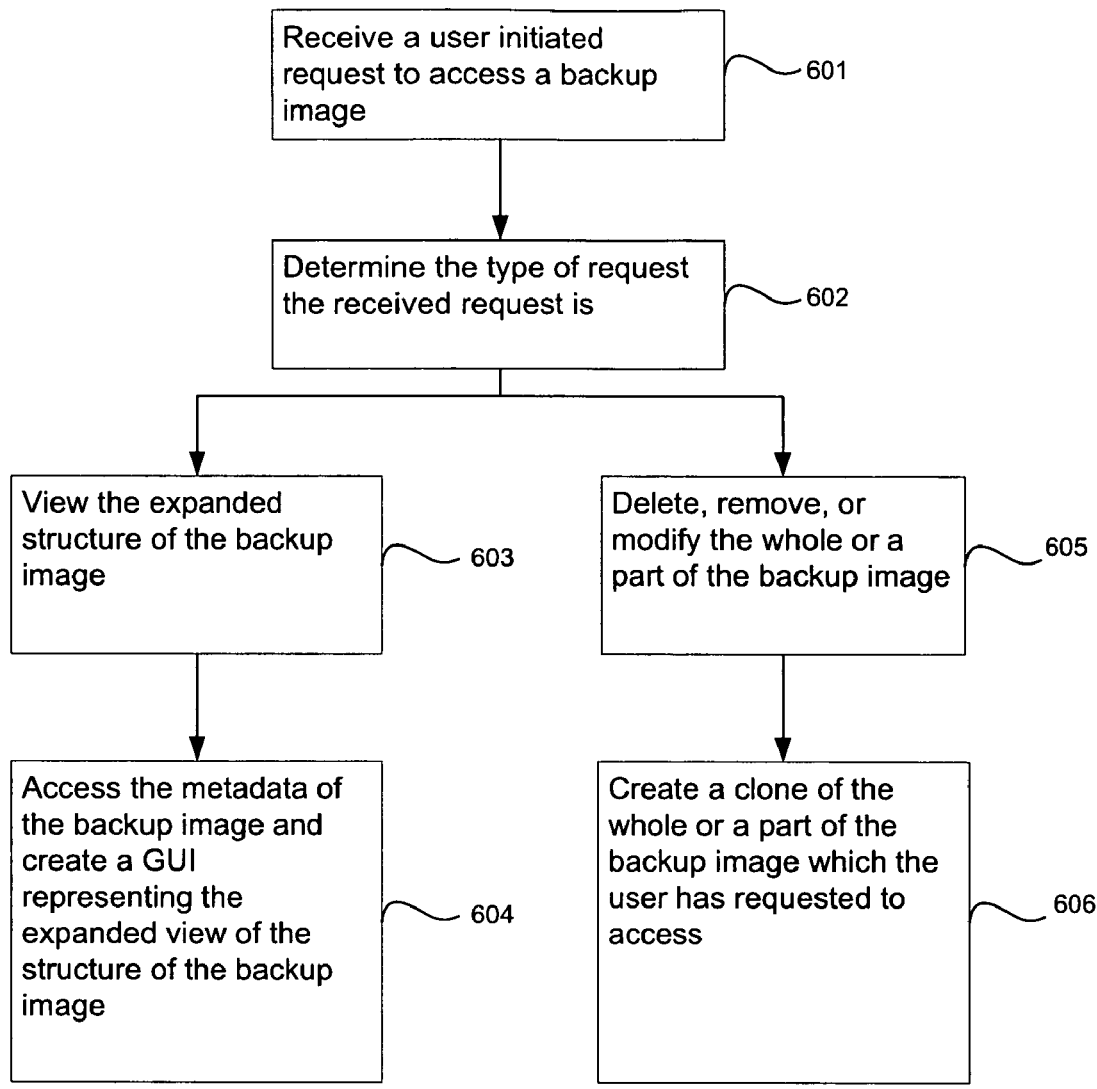
FIG. 6 is a flow diagram illustrating a process of storing a backup image of a source dataset into a storage server for multiple purposes according to an embodiment of the present invention.

FIG. 6 is a flow diagram illustrating a process of utilizing a backup image stored on a storage server for multiple purposes according to an embodiment of the present invention. At block 601, a user initiated request to access the backup image 502 stored on the storage subsystem 403 of the storage server 401 is received by the operating system 4014 running on the storage server 401 from a client 404, for example. At block 602, the storage server 402 determines what kind of request it is. If the request is to view the expanded structure of the backup image 502, i.e., the directory structure (determined at block 603), the flow goes to block 604. At block 604, the operating system 4014 of the storage server 401 accesses the set of metadata 503 of the backup image 502 stored on the storage subsystem 403. From the set of metadata, the user interface layer 006 of the operating system 4014 may construct a Graphic User Interface (GUI) or a standard protocol (e.g. NFS, CIFS) access response representing an expanded view for the structure of the backup image 502. This GUI or protocol response is sent back to the client computer 404 to be viewed by the user.

If the request is determined to be a request to delete, change, or modify the whole backup image or a part of the backup image 502, the flow goes to block 605. At block 605, the clone layer 008 of the operating system 4014 creates a clone of the whole backup image or a part of the backup image 502 which the user requested to access. As discussed above, a technology called block sharing may be used herein to create the clone. The block sharing technology is described in U.S. patent application Ser. No. 11/105,895, titled "Method and Apparatus for identifying the Eliminating Duplicate Data Blocks and Sharing Data Blocks in a Storage System", which is incorporated herein by reference. In an exemplary embodiment, block sharing allows a clone to share logical data blocks with the source file by including references (i.e., pointers) to these logical data blocks in the clone. However, from a user's perspective, the source file and the clone are two independent files. A user may make any change on the clone, yet the source file remains intact because whenever the change is targeted to a shared logical data block, a new logical data block is used to hold the change instead of overwriting the original shared logical data block. After any change, the clone and the source file still share the logical data blocks that have not been changed, but the clone also has separate data blocks that contain any changed parts. Thus, multiple clones may be created for different purposes, yet the original backup image remains intact, such that it may still be used for backup/restore purposes. The above described block sharing technology may be implemented in a write out-of-place file system. It may also be implemented in other types of file systems as long as it is implemented according to the above described principle. In alternate implementations, the clone can be created during the backup process, to ensure high performance client access.

Figure 7:
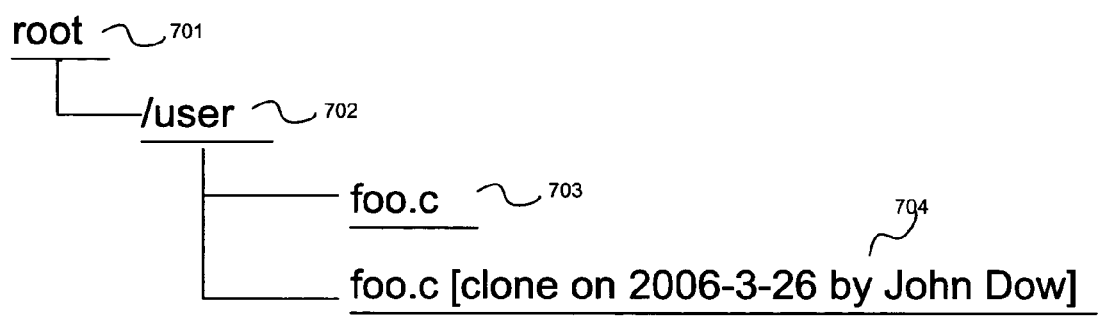
FIG. 7 shows an example of a Graphic User Interface (GUI) representing an expanded view of a directory structure of a backup image of a source dataset.

FIG. 7 is an exemplary Graphic User Interface (GUI) representing part of an expanded view of a directory structure of a backup image of a source dataset. As shown, directory 701 ("root") is the root directory of the dataset. Under the root directory 701, among many other directories, there is a subdirectory 702 ("/user"). Under the subdirectory 702 ("/user"), there are many files including file "foo.c" 703. As discussed above, if a user needs to make a change on the file "foo.c" 703, the user may use a mouse or other input device to interact with the GUI to initiate creation of a clone of the file "foo.c" 703. The user may then work on the clone for whatever his intended purposes are. An icon 704 representing this newly created clone may be added under the original file "foo.c" 703. Related information such as when the clone is created and who created it may also be implemented to be available through the GUI.

Thus, a method and system of using a backup image for multiple purposes have been described.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computerized method comprising:
  maintaining a backup image of a dataset, the backup image being stored as a plurality of data blocks, wherein the backup image has a first format specified by a set of first metadata and wherein the first format is accessible by an application;
  analyzing the set of first metadata using predetermined criteria;
  generating, based on results of the analyzing the set of first metadata, a set of second metadata, wherein the backup image has a second format specified by the set of second metadata and wherein the second format is accessible by at least one application unable to access the first format and wherein the backup image is accessible in the first format using the first metadata and wherein the backup image is also accessible in the second format using the second metadata;
  creating, in response to a request to access, using the set of second metadata, a part of the backup image, a clone of the part of the backup image, wherein the clone comprises some of the plurality of data blocks for the backup image of the dataset; and
  in response to a request to perform an operation on a target data block shared by the clone and the backup image, copying contents of the target data block to a new data block and performing the operation on the new data block, wherein the target data block remains unchanged.

2. The computerized method of claim 1 further comprising maintaining the set of second metadata, which describes a structure of the backup image and provides a basis for accessing and locating data stored in the backup image.

3. The computerized method of claim 2 further comprising creating, from the set of second metadata, an expanded view of the backup image in response to a second request.

4. The computerized method of claim 1, wherein said maintaining the backup image comprises maintaining the backup image in a file system of a storage server.

5. The computerized method of claim 4, wherein said file system comprises a write out-of-place file system.

6. The computerized method of claim 1, wherein the clone includes reference or references to said at least some of the plurality of data blocks.

7. The computerized method of claim 6, wherein each of said reference or references comprises a pointer pointing to a data block.

8. The computerized method of claim 1, wherein the backup image is created by a first application, the request being from a second application.

9. A machine-readable storage medium storing sequences of executable instructions stored therein which, when executed by a processor of a computer, cause the processor to perform a process comprising:
  maintaining a backup image on a storage server, wherein the backup image has a first structure specified by a set of first metadata and wherein the backup image is stored as a plurality of data blocks and wherein the first structure is accessible by an application;
  analyzing the set of first metadata using predetermined criteria;
  generating, based on results of the analyzing the set of first metadata, a set of second metadata, wherein the backup image has a second structure specified by the set of second metadata and wherein the second structure is accessible by at least one application unable to access the first structure and wherein the backup image is accessible in the first structure using the first metadata and wherein the backup image is also accessible in the second structure using the second metadata;
  creating, in response to a request to access, using the set of second metadata, a part of the backup image, a clone of the part of the backup image, wherein the clone comprises some of the plurality of data blocks for the backup image; and
  in response to a request to perform an operation on a target data block shared by the clone and the backup image, copying contents of the target data block to a new data block and performing the operation on the new data block, wherein the target data block remains unchanged.

10. The machine-readable storage medium of claim 9 further comprising maintaining the set of second metadata on a storage server, wherein said maintaining the backup image and the set of second metadata on the storage server comprises maintaining the backup image and the set of second metadata in a file system of the storage server.

11. The machine-readable storage medium of claim 10, wherein said file system comprises a write out-of-place file system.

12. The machine-readable storage medium of claim 9, wherein the process further comprises creating, from the set of second metadata, an expanded view of the backup image in response to a second request.

13. The machine-readable storage of claim 9, wherein the clone includes reference or references to said at least some of the plurality of data blocks.

14. The machine-readable storage medium of claim 13, wherein each of said reference or references comprises a pointer pointing to a data block.

15. A storage server comprising:
  a processor coupled to a bus;
  a memory coupled to the processor through the bus;
  a network interface through which to communicate with a client, the network interface coupled to the bus;
  a storage interface through which to access a plurality of mass storage devices on behalf of the client, the storage interface coupled to the bus; and
  instructions executed by the processor from the memory to cause the processor to
  maintain a backup image of a dataset, the backup image being stored as a plurality of data blocks, wherein the backup image has a first structure specified by a set of first metadata and wherein the first structure is accessible by an application,
  analyze the set of first metadata using predetermined criteria,
  generate, based on the results of the analyzing the first set of metadata, a set of second metadata, wherein the backup image has a second structure specified by the set of second metadata and wherein the second structure is accessible by at least one application unable to access the first structure and wherein the backup image is accessible in the first structure using the first metadata and wherein the backup image is also accessible in the second structure using the second metadata,
  and in response to a request to access, using the set of second metadata, a part of the backup image, to create a clone of the part of the backup image, wherein the clone comprises some of the plurality of data blocks for the backup image of the dataset and in response to a request to perform an operation on a target data block shared by the clone and the backup image, copying contents of the target data block to a new data block and performing the operation on the new data block, wherein the target data block remains unchanged.

16. The storage server of claim 15, wherein the process further comprises maintaining the set of second metadata, which provides a basis for accessing and locating data stored in the backup image.

17. The storage server of claim 15, wherein the process further comprises creating, from the set of second metadata, an expanded view of the backup image in response to a second request.

18. The storage server of claim 15, wherein said maintaining the backup image comprises maintaining the backup image in a file system of a storage server.

19. The storage server of claim 18, wherein said file system comprises a write out-of-place file system.

20. The storage server of claim 15, wherein the clone includes reference or references to said at least some of the plurality of data blocks.

21. The storage server of claim 20, wherein each of the reference or references comprises a pointer pointing to a data block.

22. A computerized method comprising:
receiving a backup image of a dataset of a source file system;
analyzing a set of first metadata specifying a first structure of the backup image to create a set of second metadata for the dataset, wherein the first structure is accessible by an application, the set of second metadata describing a second structure of the backup image and providing a basis for accessing and locating data stored therein using the set of second metadata, wherein the second structure is accessible by at least one application unable to access the first structure and wherein the backup image is accessible in the first structure using the first metadata and wherein the backup image is also accessible in the second structure using the second metadata;
storing the set of second metadata and the backup image as a plurality of data blocks in a second file system maintained on the storage server;
upon a read request, creating, based on the set of second metadata, an expanded view of the backup image; and
upon a modify request using the set of second metadata, creating a clone of a part of the backup image, wherein the done comprises some of the plurality of data blocks storing the backup image;

before processing the modify request, copying a target data block shared by the clone and the backup image to a new data block, wherein the modify request specifies modification of the target data block; and
processing the new data block based on the modify request, wherein the target data block remains unchanged.

23. The computerized method of claim 22, wherein the second file system comprises a write out-of-place file system.

24. The computerized method of claim 23, wherein the clone includes reference or references to said at least some of the plurality of data blocks.

25. The computerized method of claim 24, wherein each of the reference or references comprises a pointer pointing to a data block.

26. The computerized method of claim 1, wherein the first metadata is vendor specific metadata and the first format is a vendor specific format of the backup image specified by the vendor specific metadata.

27. The computerized method of claim 26, wherein the second metadata is open metadata and the second format is an open accessible data format of the backup image specified by the open metadata.

28. The machine-readable storage medium of claim 9, wherein the first metadata is vendor specific metadata and the first structure is a vendor specific structure of the backup image specified by the vendor specific metadata.

29. The machine-readable storage medium of claim 28, wherein the second metadata is open metadata and the second structure is an open accessible data structure of the backup image specified by the open metadata.

30. The system of claim 15, wherein the first metadata is vendor specific metadata and the first structure is a vendor specific structure of the backup image specified by the vendor specific metadata.

31. The system of claim 30, wherein the second metadata is open metadata and the second structure is an open accessible data structure of the backup image specified by the open metadata.

32. The computerized method of claim 22, wherein the first metadata is vendor specific metadata and the first structure is a vendor specific structure of the backup image specified by the vendor specific metadata.

33. The computerized method of claim 32, wherein the second metadata is open metadata and the second structure is an open accessible data structure of the backup image specified by the open metadata.

* * * * *